US009470302B1

(12) United States Patent
Lemmers, Jr. et al.

(10) Patent No.: US 9,470,302 B1
(45) Date of Patent: Oct. 18, 2016

(54) ACCESSORY DRIVE GEAR FOR A DIFFERENTIAL

(71) Applicant: Hamilton Sundstrand Corporation, Charlotte, NC (US)

(72) Inventors: Glenn C. Lemmers, Jr., Loves Park, IL (US); Aaron M. Finke, Janesville, WI (US); Doren C. Smith, Rockford, IL (US); Andrew P. Grosskopf, Rockford, IL (US); David S. Behling, Belvidere, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 14/678,307

(22) Filed: Apr. 3, 2015

(51) Int. Cl.
| F16H 47/04 | (2006.01) |
| F16H 55/17 | (2006.01) |
| F16H 55/06 | (2006.01) |
| F16H 48/06 | (2006.01) |
| F16H 47/00 | (2006.01) |

(52) U.S. Cl.
CPC .............. *F16H 55/17* (2013.01); *F16H 47/00* (2013.01); *F16H 48/06* (2013.01); *F16H 55/06* (2013.01)

(58) Field of Classification Search
CPC ........ F16H 55/17; F16H 48/06; F16H 47/00; F16H 55/06; F16H 1/06; F16H 55/02
See application file for complete search history.

(56) References Cited

U.S. PATENT DOCUMENTS

| 4,252,035 A | 2/1981 | Cordner et al. |
| 4,488,053 A | 12/1984 | Cronin |
| 4,734,590 A | 3/1988 | Fluegel |
| 4,953,663 A | 9/1990 | Sugden |
| 4,965,477 A | 10/1990 | Stadler et al. |
| 5,028,803 A | 7/1991 | Reynolds |
| 5,845,731 A * | 12/1998 | Buglione ............... B60K 6/26 180/65.23 |
| 6,258,004 B1 * | 7/2001 | Johnston ................ F16H 47/00 475/208 |
| 6,799,953 B2 * | 10/2004 | Nelson ................... F04B 1/188 123/446 |
| 7,472,547 B2 | 1/2009 | Grosskopf et al. |
| 8,925,421 B2 | 1/2015 | Vanderzyden et al. |
| 9,115,794 B2 * | 8/2015 | Vanderzyden .......... F16H 39/12 |
| 2005/0006164 A1 * | 1/2005 | Teraoka ................... B60K 1/00 180/243 |
| 2009/0101465 A1 * | 4/2009 | Hart ....................... B60K 6/485 192/41 R |
| 2013/0068057 A1 * | 3/2013 | Grosskopf ............... F16H 1/26 74/414 |
| 2013/0288840 A1 | 10/2013 | Grosskopf et al. |
| 2014/0008170 A1 | 1/2014 | Vanderzyden et al. |
| 2015/0013488 A1 * | 1/2015 | Matsuoka ............... B60L 11/18 74/405 |
| 2016/0003339 A1 * | 1/2016 | Roberts, III ........... F16H 55/06 74/446 |
| 2016/0016368 A1 * | 1/2016 | Kunishima ........... B29C 70/545 74/434 |

* cited by examiner

*Primary Examiner* — David J Hlavka
(74) *Attorney, Agent, or Firm* — Cantor Colburn LLP

(57) ABSTRACT

Embodiments herein relate to piece-part, sub-assembly, assembly, and component levels of a differential composed of a sun gear configuration and utilized in an integrated drive generator. An integrated drive generator is a hydro-mechanical transmission that drives a synchronous salient pole generator. The integrated drive generator is a constant speed output, variable speed input transmission that includes the differential and a hydraulic unit. In general, the integrated drive generator utilizes the variable speed input from an accessory gear box of an engine to drive or control a hydraulic unit, which in turn drives or controls a churn leg member of the differential. As the differential is driven, speeds of each speed member of the differential are then summed to generate the constant speed output to drive the synchronous salient pole generator.

20 Claims, 5 Drawing Sheets

ACCESSORY DRIVE GEAR FOR A DIFFERENTIAL

BACKGROUND OF THE INVENTION

Exemplary embodiments pertain to integrated drive generators and, more particularly, to a differential with a sun gear configuration for an integrated drive generator.

In general, aircraft electric power generation utilizes a hydro-mechanical transmission that receives a power input, at variable speed, from an engine to drive a generator at a constant speed. The hydro-mechanical transmission includes a differential to convert the variable speed of the engine to the constant speed for the generator.

At present, a configuration of the differentials used in the hydro-mechanical transmission for aircraft electric power generation is a two ring gear configuration. The two ring gear configuration includes a first ring gear to first planet gear mesh, a first planet gear to second planet gear mesh, and second planet gear to second ring gear mesh configuration. The two ring gear configuration has a specific differential ratio of one (1) due to the first and second planet gears being the same size. This specific differential ratio limits the two ring gear configuration to a lower input speed range. In addition, the two ring gear configuration forces specific packaging arrangements of the hydro-mechanical transmission. Particularly, the differential must be side-to-side with a hydraulic unit and include gearing between the differential and the hydraulic.

BRIEF DESCRIPTION OF THE INVENTION

According to one embodiment of the present invention, an accessory drive gear for an integrated drive generator is provided. The accessory drive gear comprises a gear body having an outer diametric edge, an inner diametric wall, and an inner diametric edge, wherein the outer diametric edge includes a plurality of outer gear teeth and a number of the plurality of outer gear teeth is 50.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
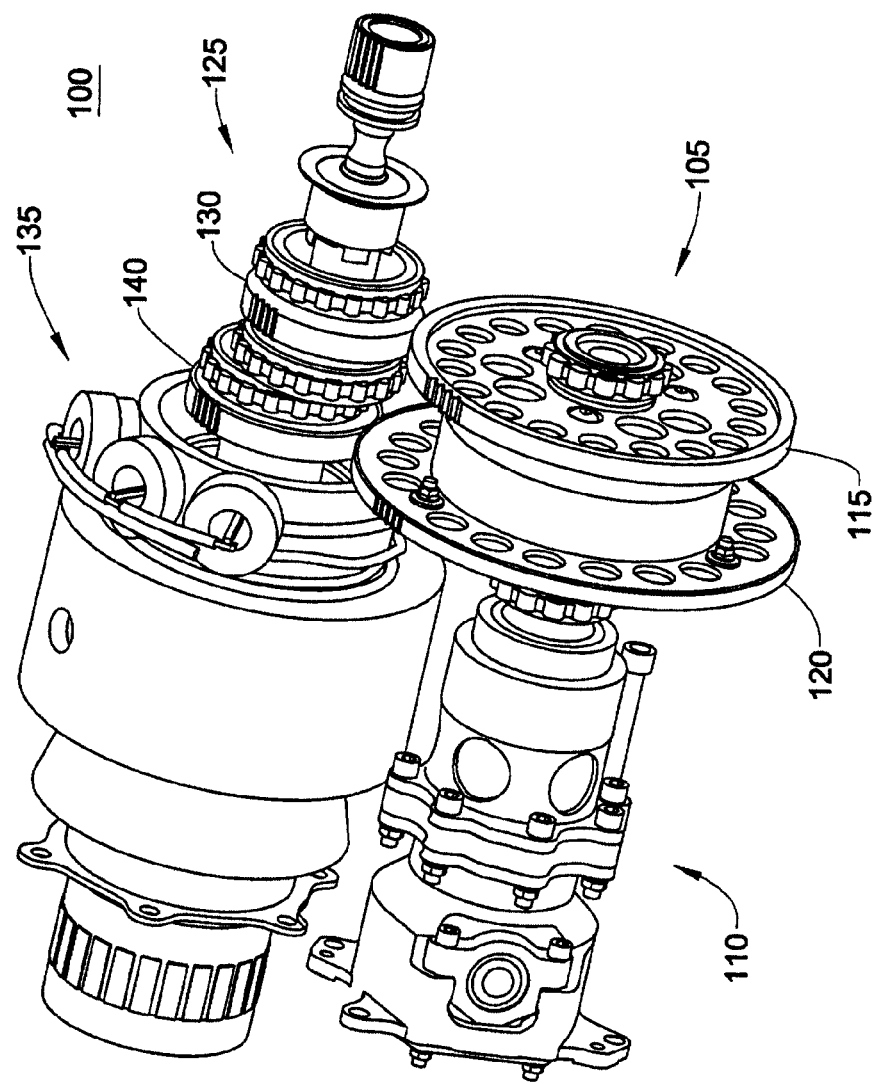
FIG. 1 depicts a perspective view of a product differential of and integrated drive generator.

In contrast to the sun-less differential type described above, embodiments herein relate to piece-part, sub-assembly, assembly, and component levels of a differential composed of a sun gear configuration and utilized in an integrated drive generator.

An integrated drive generator is a hydro-mechanical transmission that drives a synchronous salient pole generator. The integrated drive generator is a constant speed output, variable speed input transmission that includes the differential and a hydraulic unit. In general, the integrated drive generator utilizes the variable speed input from an accessory gear box of an engine to drive or control a hydraulic unit, which in turn drives or controls a churn leg member of the differential. As the differential is driven, speeds of each speed member of the differential are then summed to generate the constant speed output to drive the synchronous salient pole generator.

The differential can include speed members, such as a carrier shaft, which supports the planet gears; a sun gear; and a ring gear. The carrier shaft is driven based on the variable speed input from the engine. Note that the speed of the carrier shaft can be directly proportional to the engine speed. The carrier shaft through the planet gears drives the sun gear, which in turn drives the ring gear. The sun gear itself is independently varied (e.g., actively controlled) so that as the variable speed of the carrier shaft is transferred to the sun gear, the ring gear can be driven at a constant speed. The ring gear, thus, drives the synchronous salient pole generator at the constant speed output.

To actively control the sun gear, a piston, pump, and motor set of the hydraulic unit are utilized to vary a speed of the sun gear. The piston, pump, and motor set can be a back-to-back axial piston pump configuration, where one portion is a motor and the other portion is a pump. A first portion of the back-to-back axial piston pump configuration is driven proportionally off the speed of the engine (e.g., similar to the carrier shaft) and utilizes a variable swash plate to control displacement of the first portion. Note that based on the angle of the variable swash plate and whether that angle is a negative or positive sign the first portion can be a pump or a motor. Thus, the first portion drives or is driven by a fixed displacement pump (e.g., a second portion of the back-to-back axial piston pump configuration), which in turn controls the sun gear speed.

In view of the above, the differential of the integrated drive generator comprises a specific differential ratio (e.g., at or close to 0.5) that enables the receipt of any input speed along an extensive range. In this way, the integrated drive generator can be utilized in a high speed pad of an aircraft electric power generation system. In addition, the differential enables packaging advantages for the integrated drive generator, such as enabling the differential to be in-line with the hydraulic unit (e.g., enables coaxial packaging), which eliminates gearing between the sun gear and the hydraulic unit and reduces a size of a front region of the integrated drive generator.

Turning now to FIG. 1, a perspective view of an integrated drive generator 100 (e.g., epicyclic gear train that performs electrical power generation and speed component) that comprises a differential 105. The differential 105 includes an input driven gear 115 and an output driven gear 120 (not that these gear spins at a constant speed). The differential 105 is in-line with a hydraulic unit 110, which may include two pumps. The input driven gear 115 of the differential 105 is operatively coupled to an input system 125 via input drive gear 130. The output driven gear 120 of the differential 105 is operatively coupled to a generator 135 (e.g., main stator where electricity is generated) via a driven gear 140. Based on this operative coupling, the differential 105 converts a variable speed input from the input system 125 supplied by a variable speed drive source into a constant speed output employed to drive generator 135. The variable speed drive source can be an aircraft engine; however, it should be understood, that the variable speed drive source may take on a variety of forms.

Figure 2:
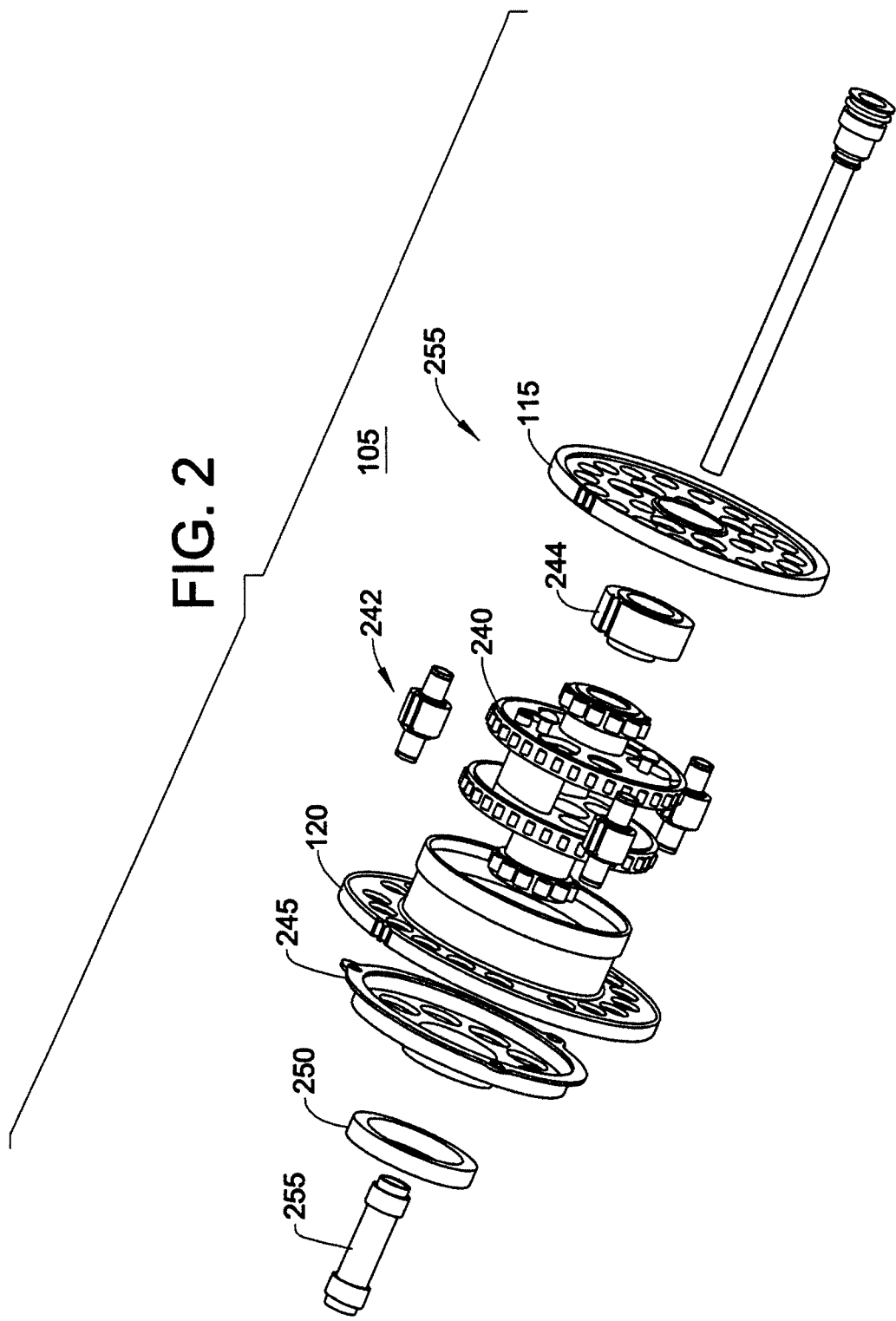
FIG. 2 depicts an exploded view of the product differential of FIG. 1.

FIG. 2 depicts an exploded view of the differential 105, which includes the input driven gear 115, the output driven gear 120, a carrier shaft 240, a planet gear system 242, a sun gear 244, an accessory drive gear hub 245, an accessory drive gear 250, a first shaft 255 that spins at a fixed speed, a second shaft 260 that spins at a variable speed, and journal bearings (not shown). The input driven gear 115 is operatively connected to the sun gear 244. The sun gear 244, along with the planet gear system 242, is supported by the carrier shaft 240. The carrier shaft 240 is coupled to the output driven gear 120, which is engages the driven gear 140 on generator 135. The output driven gear 120 is further operatively coupled to the accessory drive gear hub 245, which supports the accessory drive gear 250. The accessory drive gear 250 will now be described below with reference to FIGS. 3-5.

Figure 3:
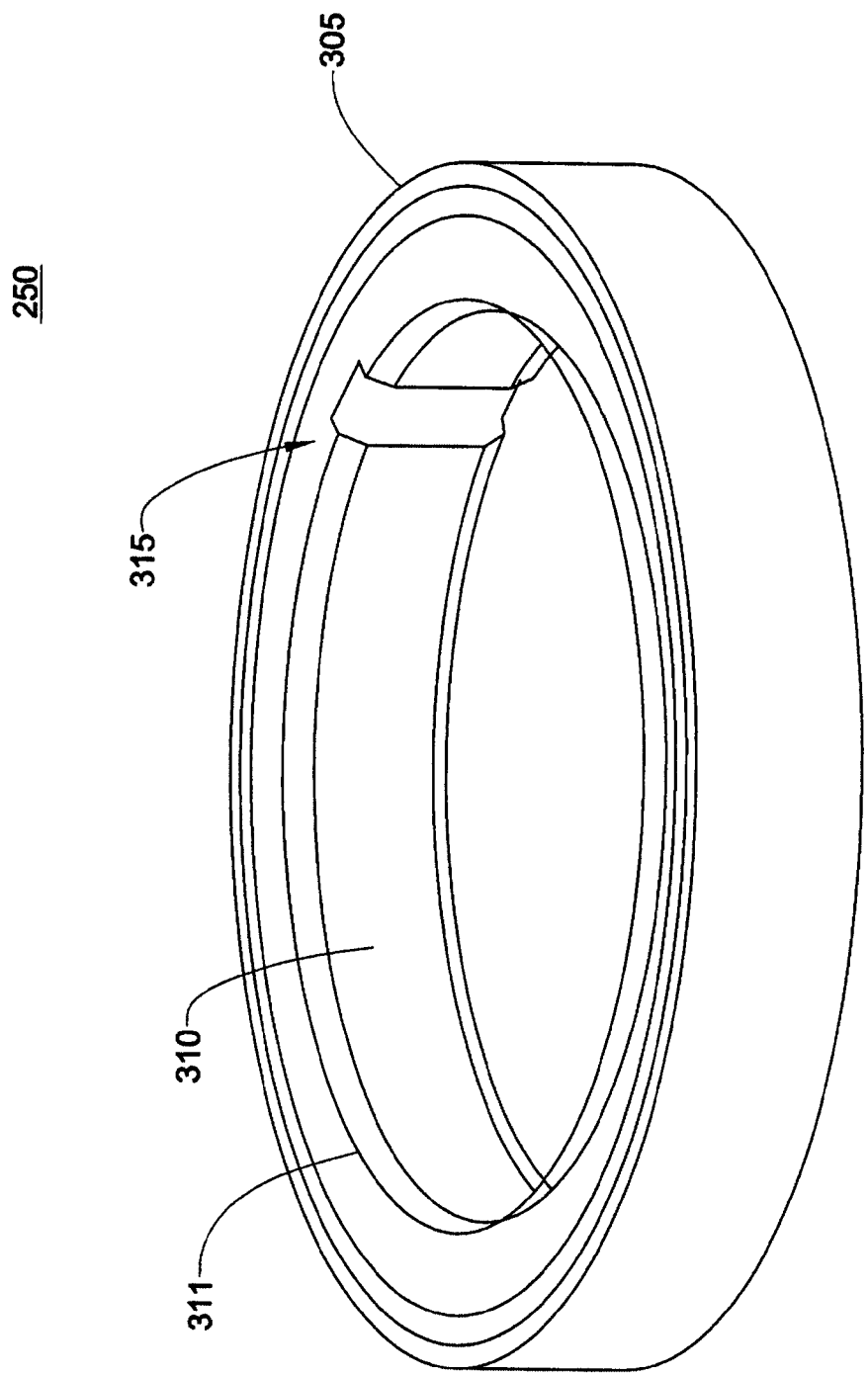
FIG. 3 illustrates an isometric view of the accessory drive gear of FIG. 2.

FIG. 3 illustrates an isometric view of the accessory drive gear 250 of FIG. 2. The accessory drive gear 250 includes a gear body having an outer diametric edge 305, an inner diametric wall 310, and an inner diametric edge 311. Outer diametric edge 305 can includes a plurality of outer gear teeth. Outer gear teeth may be 50 in number and mate with another gear with 70 teeth in number, in accordance with an embodiment. The outer gear teeth may include side surfaces that are carbonized and/or a top surface that is not carbonized. Inner diametric wall 310 includes a notch 315.

Figure 4:
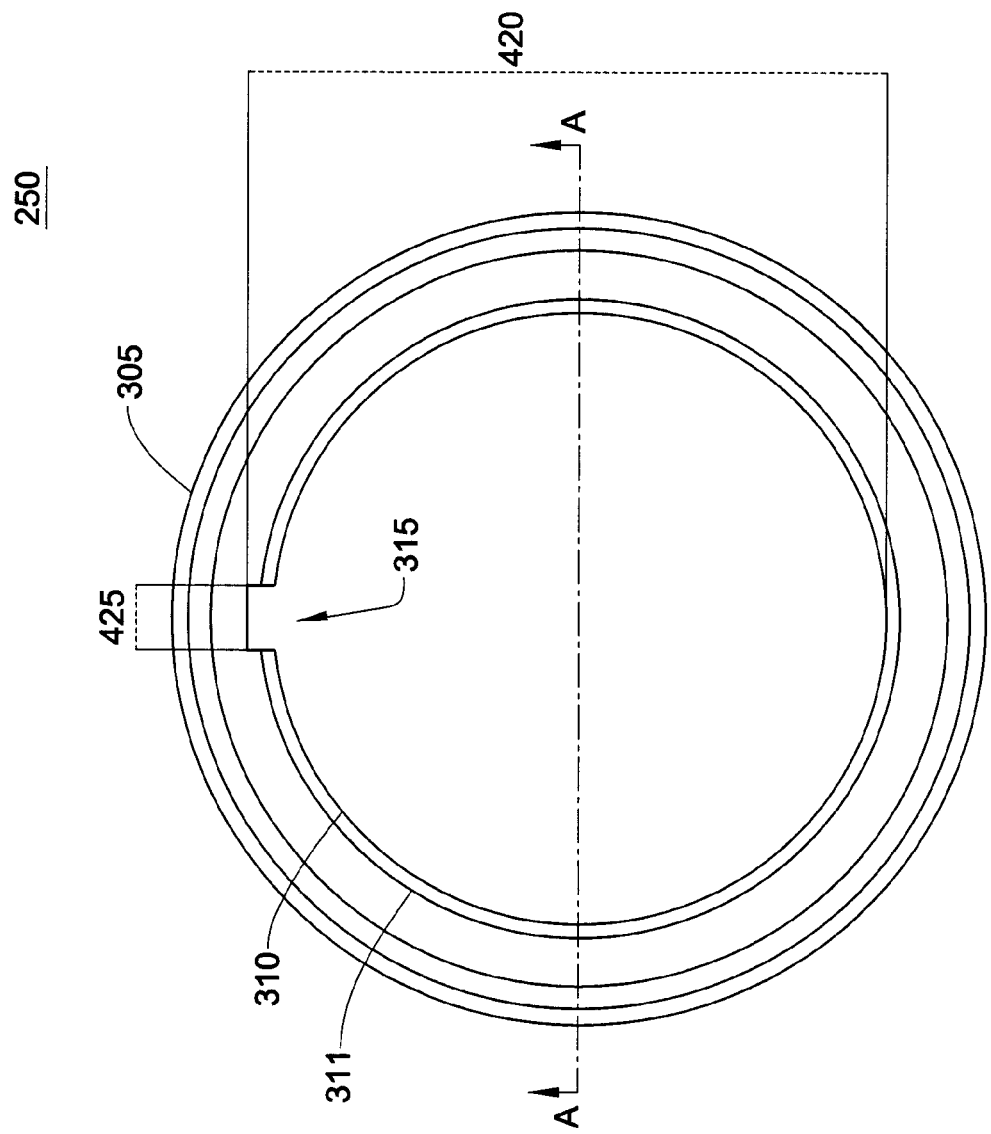
FIG. 4 illustrates a top down view of the accessory drive gear of FIG. 3.

FIG. 4 illustrates a top down view of the accessory drive gear 250 of FIG. 3, along with a plurality of demarcations. Each demarcation is illustrative of a particular portion of the accessory drive gear 250. For instance, in FIG. 4, demarcation 420 illustrates a distance between a face of the notch 315 and a portion of the inner diametric wall 310 (e.g., the portion being opposite to the face of the notch). Demarcation 425 illustrates a width of the notch 315. In some embodiments, the demarcation 420 can be about 2 inches (e.g., 1.925, 1.950, 1.975, 2.00, 2.025, etc.), and the demarcation 425 can be about 0.2 inches (e.g., 0.18, 0.19, 0.20, 0.21, etc.). Further, a diameter of the accessory drive gear 250 can be about 2.5 inches (e.g., 2.3, 2.4, 2.5, 2.6, etc.).

Figure 5:
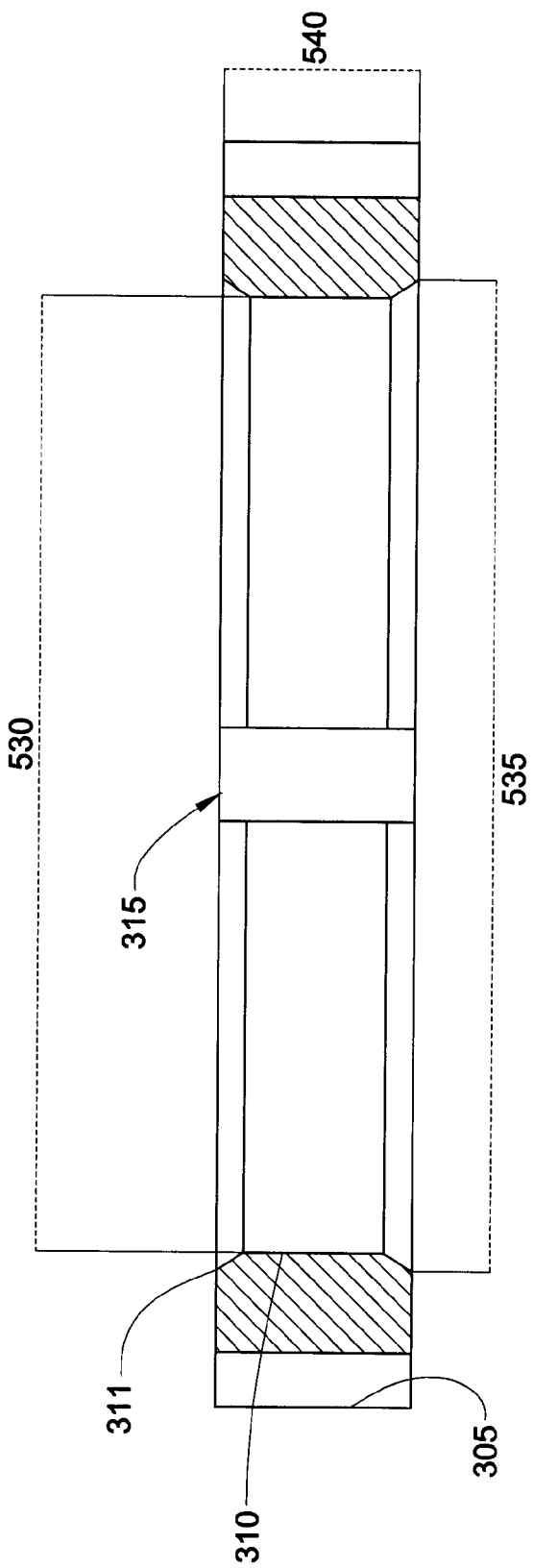
FIG. 5 illustrates a cross sectional view of the accessory drive gear of FIG. 3.

FIG. 5 illustrates a cross sectional view of the accessory drive gear 250 across the line A-A as illustrated in FIG. 3, along with a plurality of demarcations. Each demarcation is illustrative of a particular portion of the accessory drive gear 250. For instance, in FIG. 5, demarcation 530 illustrates a diameter of the inner diametric wall 310. Demarcation 535 illustrates a diameter of inner diametric edge 311. Note that a surface may connect the inner diametric wall 310 with the inner diametric edge 311. The surface may be angled, such as at any slope at or between 20 degrees to 35 degrees. Alternatively, the inner diametric edge 311 may be a part of the inner diametric wall 310.

In some embodiments, the demarcation 530 can be about 2 inches (e.g., 1.925, 1.950, 1.975, 2.00, 2.025, etc.); the demarcation 535 can be about 2 inches (e.g., 1.925, 1.950, 1.975, 2.00, 2.025, etc.). Further, the demarcation 540 or a thickness of the accessory drive gear 540 can be about 0.4 inches (e.g., 0.38, 0.39, 0.40, 0.41, 0.42, etc.).

The terminology used herein was chosen to best explain the principles of the embodiments, the practical application or technical improvement over technologies found in the marketplace, or to enable others of ordinary skill in the art to understand the embodiments disclosed herein. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof. Furthermore, the term "about" is intended to include the degree of error associated with measurement of the particular quantity based upon the equipment available at the time of filing the application. For example, "about" can include a range of ±8% or 5%, or 2% of a given value.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An accessory drive gear for an integrated drive generator, comprising:
a gear body having an outer diametric edge, an inner diametric wall, and an inner diametric edge,
wherein the outer diametric edge includes a plurality of outer gear teeth,
wherein a number of the plurality of outer gear teeth is 50.

2. The accessory drive gear of claim 1, wherein at least one of the plurality of outer gear teeth has a carbonized side.

3. The accessory drive gear of claim 1, wherein the inner diametric wall includes a notch.

4. The accessory drive gear of claim 3, wherein a width of the notch is 0.197 inches.

5. The accessory drive gear of claim 3, wherein a distance between a face of the notch and a portion of the inner diametric wall is 2.027 inches.

6. The accessory drive gear of claim 1, wherein a diameter of the accessory drive gear is 2.5 inches.

7. The accessory drive gear of claim 1, wherein a diameter of the inner diametric wall is 1.952 inches.

8. The accessory drive gear of claim 1, wherein a diameter of inner diametric edge is 2.018 inches.

9. The accessory drive gear of claim 1, wherein a surface connects the inner diametric wall with the inner diametric edge.

10. The accessory drive gear of claim 9, wherein the surface is angled at 30 degrees.

11. The accessory drive gear of claim 9, wherein the inner diametric edge is a part of the inner diametric wall.

12. The accessory drive gear of claim 1, wherein a thickness of the accessory drive gear is 0.395 inches.

13. The accessory drive gear of claim 1, wherein the accessory drive gear is included in a differential of the integrated drive generator,
wherein the differential is operatively coupled to an input system, and wherein the differential is operatively coupled to a generator.

14. The accessory drive gear of claim 1, wherein the accessory drive gear is included in a differential of the integrated drive generator,
 wherein the differential is in-line with a hydraulic unit of the integrated drive generator, and
 wherein the hydraulic unit comprises at least one pump.

15. An accessory drive gear for an integrated drive generator, comprising:
 a gear body having an outer diametric edge, an inner diametric wall, and an inner diametric edge,
 wherein the outer diametric edge includes a plurality of outer gear teeth,
 wherein a diameter of the accessory drive gear is 2.5 inches.

16. The accessory drive gear of claim 15, wherein a surface connects the inner diametric wall with the inner diametric edge.

17. The accessory drive gear of claim 15, wherein the accessory drive gear is included in a differential of the integrated drive generator.

18. An accessory drive gear for an integrated drive generator, comprising:
 a gear body having an outer diametric edge, an inner diametric wall, and an inner diametric edge,
 wherein the outer diametric edge includes a plurality of outer gear teeth,
 wherein the inner diametric wall includes a notch, and
 wherein a width of the notch is 0.197 inches.

19. The accessory drive gear of claim 18, wherein a distance between a face of the notch and a portion of the inner diametric wall is 2.027 inches.

20. The accessory drive gear of claim 18, wherein the accessory drive gear is included in a differential of the integrated drive generator.

* * * * *